United States Patent
Graham et al.

(10) Patent No.: US 10,498,672 B2
(45) Date of Patent: Dec. 3, 2019

(54) MECHANISM FOR DISTRIBUTING MPI TAG MATCHING

(71) Applicant: MELLANOX TECHNOLOGIES, LTD., Yokneam (IL)

(72) Inventors: Richard Graham, Knoxville, TN (US); Yossef Itigin, Hod Hasharon (IL)

(73) Assignee: MELLANOX TECHNOLOGIES, LTD., Yokneam (IL)

( * ) Notice: Subject to any disclaimer, the term of this patent is extended or adjusted under 35 U.S.C. 154(b) by 94 days.

(21) Appl. No.: 15/881,844

(22) Filed: Jan. 29, 2018

(65) Prior Publication Data

US 2018/0219804 A1 Aug. 2, 2018

Related U.S. Application Data

(60) Provisional application No. 62/451,823, filed on Jan. 30, 2017.

(51) Int. Cl.
*H04L 12/879* (2013.01)
*G06F 9/54* (2006.01)
*H04L 12/725* (2013.01)
*H04L 12/801* (2013.01)

(52) U.S. Cl.
CPC ............ *H04L 49/901* (2013.01); *G06F 9/54* (2013.01); *H04L 45/306* (2013.01); *H04L 47/34* (2013.01)

(58) Field of Classification Search
None
See application file for complete search history.

(56) References Cited

U.S. PATENT DOCUMENTS

| | | | |
|---|---|---|---|
| 8,170,041 B1* | 5/2012 | Underwood | G06F 13/385 370/229 |
| 8,249,072 B2 | 8/2012 | Sugumar et al. | |
| 9,742,855 B2 | 8/2017 | Shuler et al. | |
| 2009/0055836 A1 | 2/2009 | Supalov | |
| 2013/0219410 A1* | 8/2013 | Archer | G06F 15/17306 719/313 |
| 2016/0072906 A1* | 3/2016 | Shuler | H04L 67/26 709/206 |
| 2017/0085625 A1 | 3/2017 | Dinan et al. | |

OTHER PUBLICATIONS

MPI: A Message-Passing Interface Standard, (Message Passing Interface Forum), Version 3.0, 852 pages, Sep. 21, 2012.

* cited by examiner

*Primary Examiner* — Anh Ngoc M Nguyen
(74) *Attorney, Agent, or Firm* — Kligler & Associates (57) ABSTRACT

Network communication is carried out by transmitting messages in accordance with a predefined data exchange protocol among nodes that include a master domain and a plurality of client domains. A list of expected messages has a tail portion in the master domain and respective head portions in the client domains. A search is conducted for a match between the tag of a received message to tags in a list of unexpected messages that is maintained in the master domain. Upon a failure to find the match the receive is added to the list of expected messages. If a match is found then data in the message is written into a data buffer.

22 Claims, 3 Drawing Sheets

MECHANISM FOR DISTRIBUTING MPI TAG MATCHING

CROSS-REFERENCE TO RELATED APPLICATIONS

This Application claims the benefit of U.S. Provisional Application No. 62/451,823, filed Jan. 30, 2017, which is herein incorporated by reference.

A portion of the disclosure of this patent document contains material that is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND OF THE INVENTION

1. Field of the Invention

This invention relates to communication protocols for electronic data communication. More particularly, this invention relates to message passing systems for transmission of electronic data through a network.

2. Description of the Related Art

The meanings of certain acronyms and abbreviations used herein are given in Table 1.

TABLE 1

| Acronyms and Abbreviations | |
|---|---|
| MPI | Message Passing Interface |
| HCA | Host Channel Adapter |
| RDMA | Remote Direct Memory Access |

Message Passing Interface (MPI) is a communication protocol that is widely used for exchange of messages among processes in high-performance computing (HPC) systems. Messages sent from a sending process to a destination process are marked with an identifying label, referred to as a tag. Destination processes post buffers in local memory that are similarly marked with tags. When a message is received by the receiver (i.e., the host computer on which the destination process is running), the message is stored in a buffer whose tag matches the message tag. The process of finding a buffer with a matching tag for the received packet is called tag matching.

U.S. Pat. No. 8,249,072 describes an interface device for a compute node in a computer cluster, which performs MPI header matching using parallel matching units. The interface device comprises a memory, which stores posted receive queues and unexpected queues. The posted receive queues store receive requests from a process executing on the compute node. The unexpected queues store headers of send requests (e.g., from other compute nodes) that do not have a matching receive request in the posted receive queues. The interface device also comprises a plurality of hardware pipelined matcher units. The matcher units perform header matching to determine if a header in the send request matches any headers in any of the plurality of posted receive queues.

Commonly assigned U.S. Pat. No. 9,742,855 to Shuler et al, which is herein incorporated by reference, describes posting, by a software process in a message passing system, a set of buffers in a memory of a host processor and creating in the memory a list of labels associated respectively with the buffers. The software process pushes a first part of the list to a network interface controller, while retaining a second part of the list in the memory under control of the software process. Upon receiving a message containing a label, sent over a network, the network interface controller compares the label to the labels in the first part of the list and, upon finding a match to the label, writes data conveyed by the message to a buffer in the memory. Upon a failure to find the match in the first part of the list, the network interface controller passes the message from the network interface controller to the software process for handling using the second part of the list.

SUMMARY OF THE INVENTION in addition to data, messages carry information that can be used to distinguish messages and selectively receive them. This information consists of a fixed number of fields stored in a buffer, which are collectively called the message envelope. The message source is implicitly determined by the identity of the message sender. The fields are specified by arguments in the send operation.

The MPI specification (*MPI: A Message—Passing Interface Standard Version* 3.1) defines a set of rules, known as tag-matching, for matching source send operations to destination receive operations. MPI-like tag-matching poses an optimization challenge because by its nature the amount of resources that may need is unbounded. Conventionally, in order to support wild card sources or tags, a single matching engine is used for all data destined to a given target, preventing multi-domain tag-matching implementations. Embodiments of the invention provide a tag-matching architecture supporting multiple tag-matching engines. In the case of traffic that traverses a network, systems employing multiple host channel adapters and software matching engines can exploit all of them concurrently, rather than selecting one and idling the others as is done conventionally.

There is provided according to embodiments of the invention a method of communication, which is carried out by exchanging data in accordance with a predefined data exchange protocol among executing processes in at least one computing device, the processes including a master domain and a plurality of client domains, wherein messages transmitted according to the data exchange protocol have respective identification tags. The method is further carried out by establishing a list of expected messages with a tail portion in the master domain and respective head portions in the client domains, establishing a list of unexpected messages in the master domain, receiving in the master domain a posted receive from a host according to the data exchange protocol, searching for a match between the tag of the posted receive to tags in the list of unexpected messages, upon a failure to find the match adding the posted receive to the list of expected messages, and upon finding the match writing data conveyed by the posted receive into a data buffer.

According to an aspect of the method, the master domain and the client domains comprise nodes of a data network.

According to one aspect of the method, exchanging data includes establishing interprocess communication among the processes.

According to a further aspect of the method, the processes utilize a shared memory.

According to yet another aspect of the method, the posted receive is added to the head portion of the list of expected messages in one of the client domains.

According to still another aspect of the method, the posted receive is added to the tail portion of the list of expected messages in the master domain.

Still another aspect of the method includes receiving in one of the client domains an arriving message according to the data exchange protocol, comparing the tag of the arriving message with tags in the head portion of the list of expected messages in the one client domain, and upon a failure to find a match with the tag of the arriving message in the head portion of the list of expected messages in the one client domain, passing the arriving message to the master domain.

An additional aspect of the method is carried out in the master domain by comparing the tag of the arriving message with tags of messages in the tail portion of the list of expected messages, and upon a failure to match the tag of the arriving message with the tags of messages in the tail portion of the list of expected messages, adding the arriving message to the list of unexpected messages.

The posted receive can be a wildcard source message and an aspect of the method includes adding the posted receive only in the tail portion of the list of expected messages in the master domain, and preventing addition of new messages to the head portions of the client domains until the wildcard message has been matched with another message that was sent from an originating process of the wildcard source message.

There is further provided according to embodiments of the invention a method of communication, which is carried out by exchanging data with an executing computer process in accordance with a predefined data exchange protocol via a network, the process including a master domain and client domains. The client domains receive data via the network from remote processes via respective client host channel adapters. The messages have respective identification tags. The messages including posted receives arriving in the master domain and arriving messages in the client domains from the client host channel adapters. The method is further carried out by establishing a list of expected messages having a tail portion in the master domain and respective head portions in the client domains in memories of the client domains, and matching tags of the posted receives and the arriving messages in the head portion of the list of expected messages of the client domains.

There is further provided according to embodiments of the invention an apparatus, including a computer, a memory, and at least one host channel adapter connecting the computer with a data network. The computer is configured for executing a process having a master domain and client domains, the process receives messages via the network according to a predefined data exchange protocol from remote processes via the at least one host channel adapter. The messages have respective identification tags. The messages including posted receives arriving in the master domain and arriving messages in the client domains, The computer is configured for establishing a list of expected messages in the memory having a tail portion in the master domain and respective head portions in memories of the client domains, and matching tags of the posted receives and the arriving messages in the head portion of the list of expected messages of the client domains.

BRIEF DESCRIPTION OF THE SEVERAL VIEWS OF THE DRAWINGS

For a better understanding of the present invention, reference is made to the detailed description of the invention, by way of example, which is to be read in conjunction with the following drawings, wherein like elements are given like reference numerals, and wherein.

DETAILED DESCRIPTION OF THE INVENTION

In the following description, numerous specific details are set forth in order to provide a thorough understanding of the various principles of the present invention. It will be apparent to one skilled in the art, however, that not all these details are necessarily always needed for practicing the present invention. In this instance, well-known circuits, control logic, and the details of computer program instructions for conventional algorithms and processes have not been shown in detail in order not to obscure the general concepts unnecessarily.

Documents incorporated by reference herein are to be considered an integral part of the application except that, to the extent that any terms are defined in these incorporated documents in a manner that conflicts with definitions made explicitly or implicitly in the present specification, only the definitions in the present specification should be considered. Definitions.

A "communicator" is a data object that encapsulates all point-to-point and collective communication involving an MPI object. A communicator is essentially a group of processes, with each process within the group being assigned a unique identifier or rank;

An MPI "message envelope" is an object that carries information that can be used to distinguish messages and selectively receive them. This information consists of a fixed number of fields: source; destination; tag; and communicator. The operations MPI_SEND" and related operations such as MPI_RECEIVE are explained in the above-noted MPI Specification and are well known in the art.

A "receive" is a message sent to a receiver as a result of an MPI_Send or related function.

A "posted-receive" is the result of an application making a call to the function MPI_Recv, or a related function. A posted receive and a send both trigger tag-matching logic. However, in current embodiments a send operation by itself does not directly trigger tag-matching logic in the sending process; however tag-matching may be triggered in the receiving process by arrival of the data.

"Receive" and "Posting a Receive": The procedure of "posting a receive" is initiated by making a receive buffer available for use by using an MPI_Recv or related function as well as an associated tag-matching envelope. A message is sent by a sender to a receiver using the function MPI_Send or other related functions. This message includes a send-side message envelope. At the receiving process the arriving message is referred to as being received, and based on MPI tag-matching rules may be placed in a posted-receive buffer, or set aside in an unexpected message list until an appropriate MPI function is called.

Arriving Message ("on the wire") sent by a user application. This refers to arrival of message at a receiving process that has posted or will post a receive relating to the arriving message. The message specifies a send buffer from which the message data is taken. The receiving process interprets the arriving message as having the meaning: "send the data in this message to some process from the send buffer with the arriving message's envelope". The tag of the arriving message is matched with lists of messages, as explained below.

A "domain" as applied to a process herein refers an isolated entity in a computer application is immune from direct interference by other such entities. The entity has exclusive control of a tag-matching space in a memory.

The term "matching" encompasses two categories:

1. Matching of posted receives (receives posted by the destination process, i.e., the master domain). As explained below, when such a message is first posted, it is attempted to be matched against an "unexpected message list" comprising messages that have arrived from other MPI processes.

If no match is found it is posted to an "expected message list", also known as a "posted receive list".

2. Matching of messages arriving from a data network against the posted receive list. The head portion of the list may be found in a client domain and handled by the client domain, e.g., by specialized hardware tag matching engines, and the rest of the list found in the master domain.

The term "expected receives" refers to posted receives that are not matched to the unexpected message list. Expected receives are often referred to herein as "expected messages".

The term "unexpected receives" refers to messages from a sender that do not match a message in the expected message list. Unexpected receives are often referred to herein as "unexpected messages".

MPI Communication.

A brief outline of some relevant aspects of MPI communication will facilitate understanding of the embodiments disclosed below:

The sender of an MPI message includes a message envelope having the following four items:

Communicator.

Source rank—the process (MPI rank) from which the data originates. (A wildcard may be specified by the receiver, i.e., the receiver will accept a message originating from any source)

Destination rank—the process that receives the data.

User Defined tag—This is an integer-that can be used to distinguish different messages.

MPI tag-matching is non-temporal, requiring posted receive and send-side matching parameters to match. Wild cards are supplied by the receiver. In particular, the receiver can insert a wildcard in the source rank of the envelope of a posted receive (MPI_ANY_SOURCE), which indicates that it will accept a message originating from any source (provided that other matching criteria are satisfied).

Ordering rules require that when more than one pair of send and receive message envelopes may match, the pair that includes the earliest posted-send and the earliest posted-receive is the pair that must be used to satisfy the matching operation. However, this does not imply that tags are consumed in the order they are created, e.g., a later generated tag may be consumed, if earlier tags cannot be used to satisfy the matching rules.

In the discussion below, the term "wildcard source message" refers to a message having a wildcard in the source rank of its posted receive message tag, allowing a single message from any source to match the source rank matching criteria. In other words, for a communicator of size N, data arriving from any one of those N processes will be accepted (if the other three matching criteria are also met).

The term "wildcard process source" refers to the rank of the process that originated a wildcard source message, i.e., a message whose posted receive message tag has a wildcard inserted in its source rank.

Overview.

Figure 1:
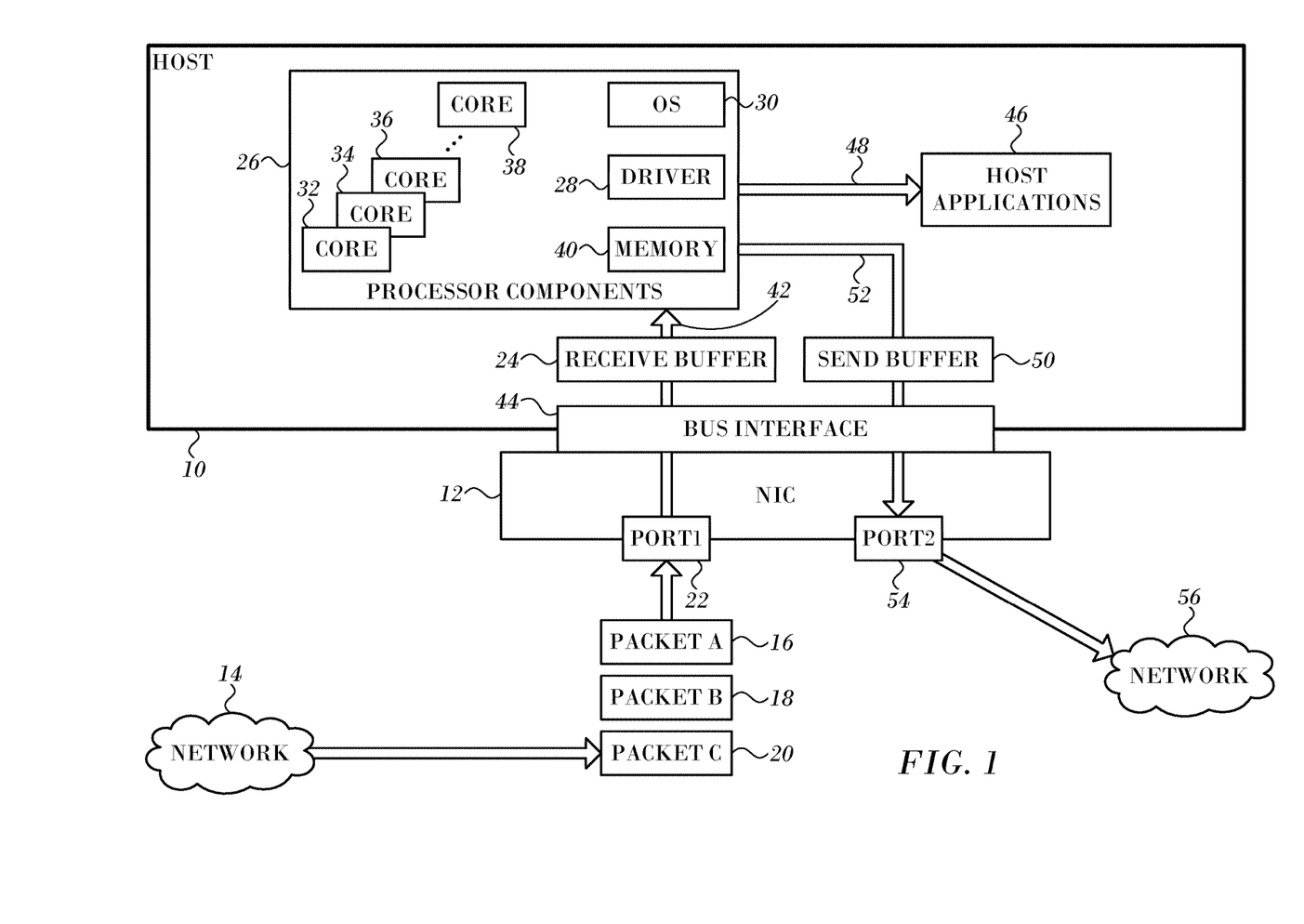
FIG. 1 schematically illustrates a network element, which is connected via a network interface to a data network in accordance with an embodiment of the invention.

Turning now to the drawings, reference is initially made to FIG. 1, which schematically illustrates a network element, host 10, which is connected via network interface 12 to a data network 14 in accordance with an embodiment of the invention. Although portions of the arrangement shown in FIG. 1 are shown as comprising a number of separate functional blocks, these blocks are not necessarily separate physical entities, but rather may represent, for example, different computing tasks or data objects stored in a memory. In practice, however, these blocks are typically (although not necessarily) implemented as hardware and firmware components within a single integrated circuit chip or chipset. Additionally or alternatively the tasks and data objects may be embodied in a non-transitory computer-readable medium.

A stream of incoming data packets, here represented by packets 16, 18, 20, arrives from the network 14, entering the network interface 12 via port 22. The packets 16, 18, 20 are communicated from the network interface 12 to a packet queue in a receive buffer 24. While the receive buffer 24 is shown within the host 10, it may be implemented within the network interface 12.

Processor components 26 comprises network driver 28, operating system 30, and a plurality of cores 32, 34, 36, 38. While four cores are shown in the example of FIG. 1, any number of cores may be present. In addition, a suitable memory 40 is provided for processing the packets 16, 18, 20. The principles of the invention are applicable to many multi-processor architectures other than the example of FIG. 1. Thus, the term "CPU" is sometimes used interchangeably with "core" in this disclosure. A core may be a processing element of a logical processor as well as a physical processor. Network interface 12 is connected to the system components 26 via a peripheral component bus 42 (indicated by arrow 42), such as a PCI Express bus, through a bus interface 44, Elements of the packets 16, 18, 20 are extracted from the receive buffer 24 and distributed into a number of tables in memory 40 that are maintained for purposes of packet steering.

In general one set of the incoming packets 16, 18 20 are destined for use by host applications 46, as indicated by arrow 48. It is the responsibility of the network driver 28 and the operating system 30 to process and forward another set of incoming packets that constitutes IP forwarding traffic.

Packets needing to be forwarded are placed in some embodiments, when it is determined by logic within the system components 26 that a given packet constitutes IP forwarding traffic an entry is established for the packet in a send buffer 50. The network driver 28 places the payload of the current packet in a queue.

The IP forwarding traffic is returned to the network interface 12, as indicated by arrow 52. The IP forwarding traffic then leaves the network interface 12 via port 54 and is returned to network 56, which may be the same as network 14 or may be a different network as shown in FIG. 1.

First Embodiment

Figure 2:
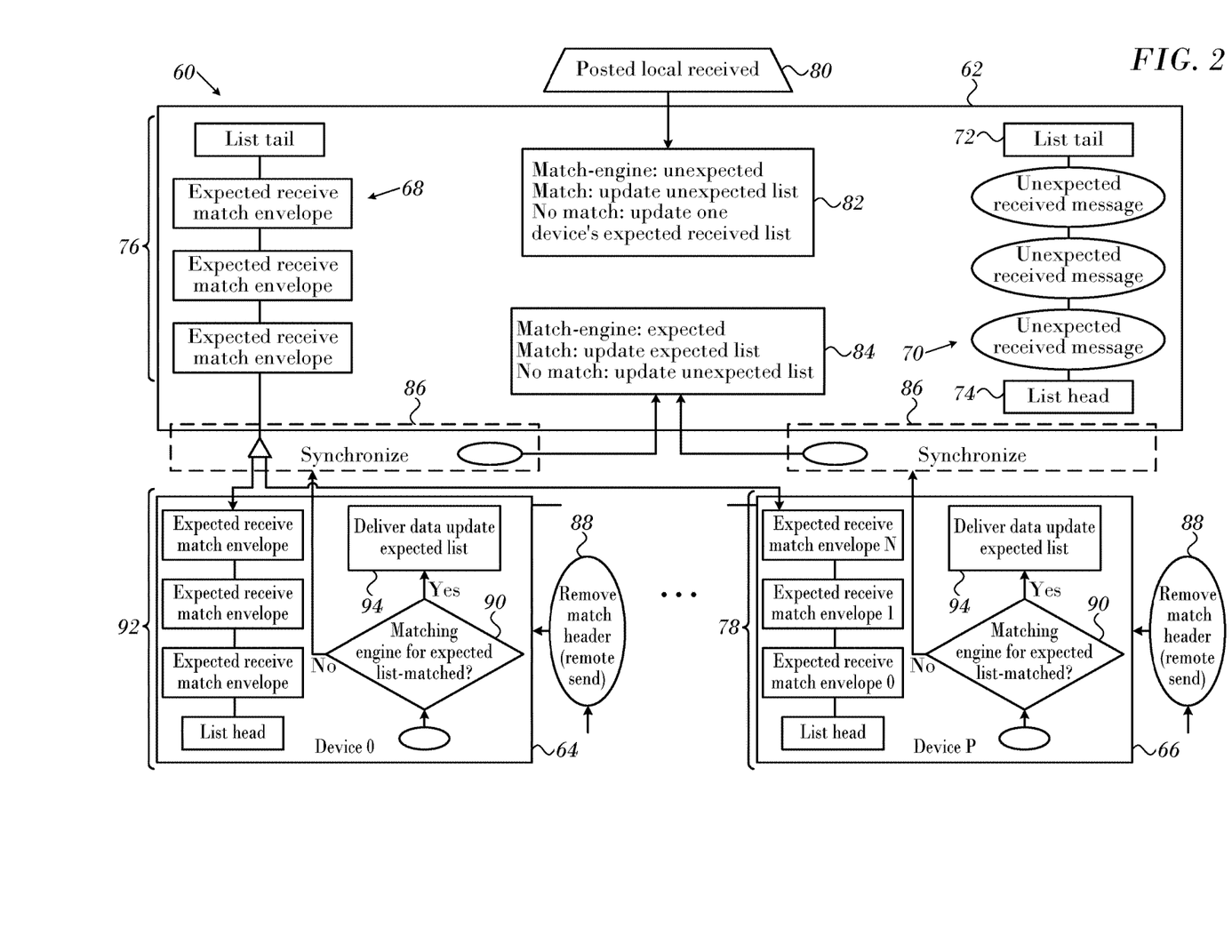
FIG. 2 is a block diagram illustrating an arrangement for tag-matching in MPI messages, in accordance with an embodiment of the invention.

Reference is now made to FIG. 2, which is a block diagram illustrating an arrangement 60 for tag-matching in MPI messages, in accordance with an embodiment of the invention. The arrangement 60 supports multi-domain tag-matching, which enhances tag-matching resource utilization, using distinct tag-matching engines for data destined to a single target. For example, a single MPI process tag-matching may exploit shared-memory and optimizations for local communication. In the case of arriving MPI messages over the network multiple tag-matching host channel adapters (HCA's) are simultaneously used, rather than using only one host channel adapter and idling the others.

The MPI ordering rules require that when more than one pair of send and receive message envelopes match, the pair that includes the earliest posted-send and the earliest posted-receive is the pair that must be used to satisfy the matching operation.

Wild-cards matching parameters complicate the distributed matching problem, with data from any source being able to satisfy a wildcard source matching parameter, and any tag being able to match a wildcard tag matching parameter. Even with the wildcard matching, ordered matching between a pair of end-points is required.

In the arrangement 60 there is a single master domain, indicated as master device 62 and any number of client matching domains, shown representatively in FIG. 2 as devices 64, 66. Two objects are employed for ordering received messages: an expected message list 68; and an unexpected message list 70 of MPI envelopes. The unexpected message list 70, including its head 74 and tail 72, is maintained entirely in the master domain, e.g., in the master device 62.

The expected message list 68 (the list that includes posted receives) may be distributed between a given client context and the master context, with the head of the expected message list 68 maintained by the client, and the tail in the master domain, e.g., in a server. One server may maintain the tails for all the client lists. In the embodiment of FIG. 2 the master context is a logical entity that is implemented in the master device 62 and the client contexts are implemented similarly in the devices 64, 66. In other embodiments the master and client contexts may be implemented in specialized hardware or distributed software and hardware logic in many combinations, and not necessarily in the same physical device depending on hardware and network capabilities. All such arrangements are considered to be within the scope of the present invention.

In FIG. 2, tail portion 76 of the expected message list 68 is held in the master device 62, while head portions 78 of the expected message list 68 are maintained in the devices 64, 66 and hold arriving messages relating to the respective devices 64, 66. Further details are disclosed in the above noted U.S. Pat. No. 9,742,855.

The master device 62 decides how to partition the expected message list 68 between itself and the appropriate client. It may use several criteria, such as upper limit on the size of the client list, the size of the messages, or any other such criteria. However, the master device 62 can only post messages above a specific size in the expected message list 68. Moreover, once one of the above-stated criteria is applied and messages are kept in the master context (in the tail portion 76 of the expected message list 68 held in the master device 62), no more messages may be posted to client contexts (the head portion 92 of the expected message list 68 held in the client devices 64, 66) until all messages in the master context have been matched, similar to the case of wildcard receives. Posted messages with a wildcard source are never posted to the clients, even if the tail portion in the master device is empty. Once a wildcard message, i.e., a posted-receive with a wild-card source is posted, no other posted-receives will be posted to any clients until these wildcard messages are matched in the master context in the master device 62. This allows exactly one copy of the wildcard posted receive to be present in all the lists, i.e., in the tail portion 76 of the expected message list 68, all instances of the head portion 92 of the expected message list 68 and the unexpected message list 70. This copy is matched only once without the race conditions that would exist if the wildcard posted receive were posted to multiple lists by more than one tag-matching engine. In the arrangement of FIG. 2, as described below, the master tag-matching engine (block 82) matches all new posted-receives against unexpected messages. The master tag-matching engine is the entity to which posted receives are directed, and it also handles matching of unexpected messages arriving at the destination (the target MPI process) from the data source, i.e., the MPI rank from which the data is sent. The master tag-matching engine either directs a receive to the appropriate tag-matching client, or processes it on its own.

The implementation of the expected message list 68 and the unexpected message list 70 objects is not specified, and can take one of several forms, with the requirement that the expected receives from a given source are arranged in order of issue, taking into account matching wild-cards. Unexpected messages are also ordered by the order in which they are issued. This may be a single link list for each object, or multiple such lists, each handling a range of matching parameters. The implementation can include a hash, or any other ordering objects.

Tag-matching is divided into two parts: handling of newly posted receives, and the processing of arriving messages.

A posted receive, i.e., a message originating from the host (not shown) of the master device 62 is indicated in block 80. The message is submitted to the master tag-matching engine in block 82 that examines the unexpected message list 70. If a match is found with an element of the unexpected message list 70, then data conveyed by the message is written to a buffer in the memory that is associated with the tag and a notification is submitted to the process that may utilize the data.

When a match is not found in the unexpected message list 70, then in block 84 the posted receive is added to the expected message list 68. The message may be identified with one of the devices 64, 66. Data conveyed by the message is written to a buffer in the memory that is associated with the label, and is processed by the device with which the message is identified.

However, if the new posted receive is a wildcard source message, it remains in the expected message list 68 until matched with another message that was sent from the wildcard process source, i.e., from the originating process of the wildcard source message. Moreover, until the wild-card source message is matched with the other message, no new messages may be appended to head portions 78, 92 in the devices 64, 66. This restriction prevents the wildcard source message from being matched by tag-matching engines in the client domains with data arriving from sources other than the wildcard process source. The restriction insures that only one tag-matching engine, the tag-matching engine in the master domain, can match a posted receive of a wildcard source message.

Synchronization of the devices 64, 66 and the master device 62 is accomplished in blocks 86. The master and client domains are not assumed to be tightly coupled with respect to the tag-matching operation. Therefore an implementation-specific synchronization mechanism is desirable to deal with the case that the client domain detects in incoming message as unexpected and passes it to the client domain. Synchronization is required to deal with potential race conditions that can occur in the distributed tag-matching logic. Its details are outside the scope of this disclosure.

MPI messages may arrive at the devices 64, 66 from remote sites via a network in blocks 88. Data from a given source arrives at only one of the devices 64, 66. In block 90 a tag-matching engine in each of the devices 64, 66 examines the portion of the expected message list 68 that it possesses, i.e., the head portion 92. If no match is found the message is passed to the master device 62 where tag matching is performed in block 84 as described above. If no match is found in the tail portion 76 of the expected message list 68, then the message is added to the unexpected message list 70 for subsequent evaluation in block 82.

In order to comply with MPI matching semantics, arriving messages in the devices 64, 66 may always be matched to head portion 92 of the expected message list 68, even when the master device 62 has stopped passing it new posted receive messages.

In any of the above cases when the HCA finds the match to the tag a completion report is sent from the HCA to the software process to indicate that the label has been consumed, and the list of the tags posted by the software process in response to the completion report is updated. In some cases, writing the data to a buffer can include performing an RDMA operation by the HCA in order to retrieve the data from another node, and after writing the retrieved data to the buffer, submitting a further completion report from the HCA to the software process to indicate that the data are available in the buffer. Updating of the sort is performed in block 94 by the devices 64, 66 and in block 84 by the master device 62.

Second Embodiment

Figure 3:
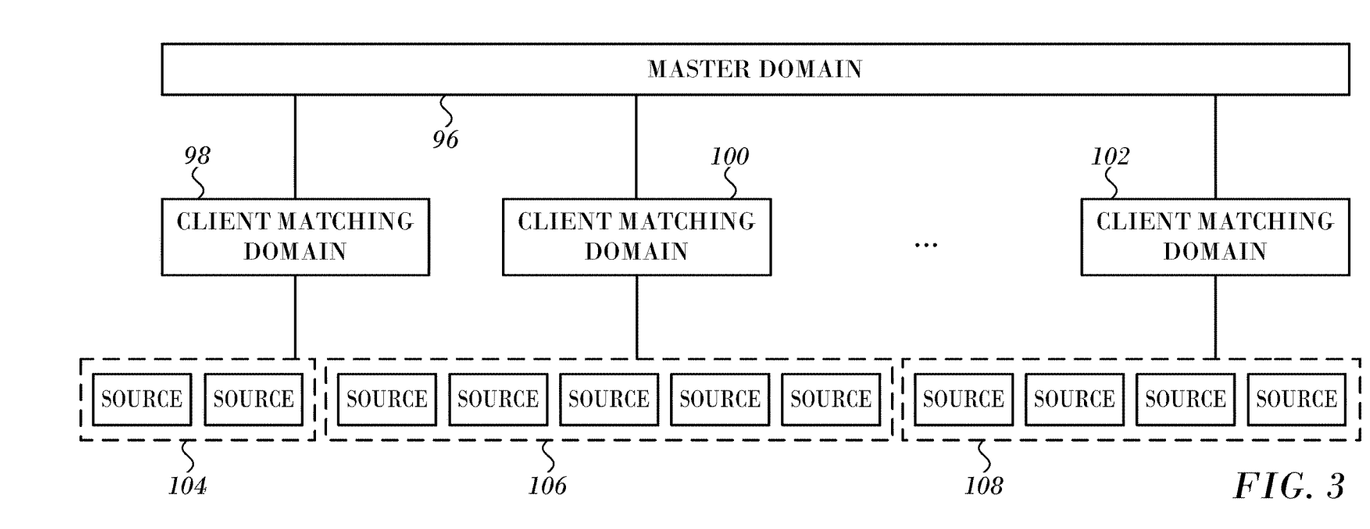
FIG. 3 is a block diagram of an arrangement in which client matching domains handle data sent from an assigned subset of the sources in accordance with an embodiment of the invention.

Reference is now made to FIG. 3, which is a block diagram of an embodiment of the invention, in which client matching domains handle data sent from an assigned subset of the sources. FIG. 3 includes a master domain 96 and any number of client matching domains, indicated as client matching domains 98, 100, 102. Each of the client matching domains 98, 100, 102 is assigned a set of sources from which it receives messages. The size of the sets need not be identical. In this example client matching domain 98 is assigned a set 104 having two sources. Client matching domain 100 is assigned a set 106 having five sources. Client matching domain 102 is assigned a set 108. Expected and unexpected lists are organized as described above with reference to FIG. 2.

In some embodiments executing computer processes comprise the domains. Each such process can have its own master domain and zero or more client domains. The client domains receive data from other processes using specific remote host channel adapters, based on network connectivity, or from a local source in the host, such as a local host channel adapter, or shared memory. For example, one process may use two different host channel adapters, each handling data from a separate subset of the remote processes. Each remote process spilling the tail portion of its list of expected messages into a common tail in the respective master domain (e.g., the tails can be merged in the master domain. Alternatively, the master domains may maintain separate tail portions for the remote processes. The number of "lists" can vary from 1 to the number of MPI processes in the job, with the requirement that a per-source ordering be maintained Once wild-card posted receive source messages arrive the master domain 96 handles all new posted receive messages, until the wild-card receive messages are matched. Thereafter new posted receives can be passed to the client matching domains 98, 100, 102.

The master domain 96 can take over handling new posted receives under certain other circumstances, for example once resource limits are reached in the client matching domains 98, 100, 102, or other criteria are met, e.g., when a predetermined message size is exceeded. Additionally or alternatively performance considerations may make it beneficial to define some minimal threshold below which messages are always handled by the master domain 96.

Figure 4:
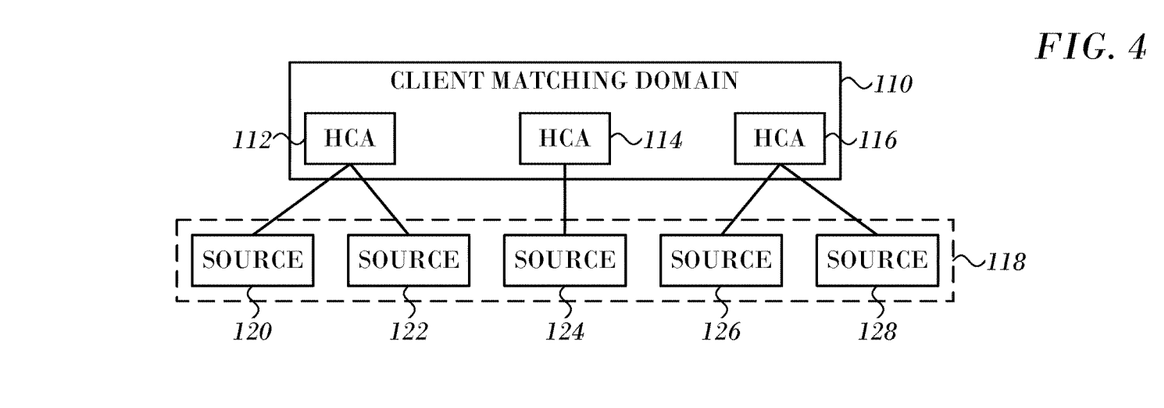
FIG. 4 is a detailed block diagram of a client matching domain in accordance with an alternate embodiment of the invention.

In either of the above embodiments shared memory optimizations can be implemented and matching can be HCA-based as described. In nodes having multiple HCAs, each HCA can be assigned to handle message matching for a subset of remote data sources. This is shown in FIG. 4, which is a detailed block diagram of a client matching domain 110, in accordance with an alternate embodiment of the invention. The client matching domain 110 is provided with three host channel adapters, HCAs 112, 114, 116. Client matching domain 110 has been assigned a set 118 of sources 120, 122, 124, 126, 128. HCA 112 is allocated sources 120, 122. HCA 114 is allocated source 124. HCA 116 is allocated sources 126, 128 for receipt of messages.

It will be appreciated by persons skilled in the art that the present invention is not limited to what has been particularly shown and described hereinabove. Rather, the scope of the present invention includes both combinations and sub-combinations of the various features described hereinabove, as well as variations and modifications thereof that are not in the prior art, which would occur to persons skilled in the art upon reading the foregoing description.

The invention claimed is:

1. A method of communication, comprising the steps of:
exchanging data in accordance with a predefined data exchange protocol among executing processes in at least one computing device, the processes comprising a master domain and a plurality of client domains, wherein messages transmitted according to the data exchange protocol have respective identification tags;
establishing a list of expected messages having a tail portion in the master domain and respective head portions in the client domains;
establishing a list of unexpected messages in the master domain;
receiving in the master domain a posted receive from a host according to the data exchange protocol;
searching for a match between the tag of the posted receive to tags in the list of unexpected messages;
upon a failure to find the match adding the posted receive to the list of expected messages; and
upon finding the match writing data conveyed by the posted receive into a data buffer.

2. The method according to claim 1, wherein the master domain and the client domains comprise nodes of a data network.

3. The method according to claim 1, wherein exchanging data comprises establishing interprocess communication among the processes.

4. The method according to claim 3, wherein the processes utilize a memory, at least a portion of the memory being a shared memory.

5. The method according to claim 1, wherein adding the posted receive comprises adding the posted receive to the head portion of the list of expected messages in one of the client domains.

6. The method according to claim 1, wherein adding the posted receive comprises adding the posted receive to the tail portion of the list of expected messages in the master domain.

7. The method according to claim 1, further comprising the steps of:
   receiving in one of the client domains an arriving message according to the data exchange protocol;
   comparing the tag of the arriving message with tags in the head portion of the list of expected messages in the one client domain; and
   upon a failure to find a match with the tag of the arriving message in the head portion of the list of expected messages in the one client domain, passing the arriving message to the master domain.

8. The method according to claim 7, further comprising the steps of:
   in the master domain comparing the tag of the arriving message with tags of messages in the tail portion of the list of expected messages; and
   upon a failure to match the tag of the arriving message with the tags of messages in the tail portion of the list of expected messages, adding the arriving message to the list of unexpected messages.

9. The method according to claim 1, wherein the posted receive is a wildcard source message, further comprising the step of:
   adding the posted receive only in the tail portion of the list of expected messages in the master domain; and
   preventing addition of new messages to the head portions of the list of expected messages in the client domains.

10. The method according to claim 9, further comprising the steps of:
    matching the posted receive with another message that was sent from an originating process of the posted receive; and
    thereafter allowing addition of new messages to the head portions of the list of expected messages in the client domains.

11. A method of communication, comprising the steps of:
    exchanging data with an executing computer process in accordance with a predefined data exchange protocol via a network, the process comprising a master domain and client domains, the client domains receiving data via the network from remote processes via respective client host channel adapters, wherein messages transmitted according to the data exchange protocol have respective identification tags, the messages comprising posted receives arriving in the master domain and arriving messages received in the client domains from the client host channel adapters;
    establishing a list of expected messages having a tail portion in the master domain and respective head portions in memories of the client domains; and
    matching tags of the posted receives and the arriving messages in the head portion of the list of expected messages of the client domains.

12. The method according to claim 11, further comprising the steps of:
    establishing a list of unexpected messages in the master domain;
    receiving in the master domain a new posted receive according to the data exchange protocol;
    comparing the tag of the new posted receive to the tags in the list of unexpected messages; and
    upon a failure to find a match with the tag of the new posted receive in the list of unexpected messages adding the new posted receive to the list of expected messages.

13. The method according to claim 12, wherein adding the new posted receive to the list of expected messages comprises adding the new posted receive to the head portion of the list of expected messages of one of the client domains.

14. The method according to claim 12, wherein the new posted receive has an originating process and is a wildcard source message, further comprising the steps of:
    adding the new posted receive to the list of expected messages and
    preventing addition of new messages to the head portions of the list of expected messages in the client domains.

15. The method according to claim 14, further comprising the steps of:
    matching the new posted receive with another message that was sent from the originating process of the new posted receive; and
    thereafter allowing addition of new messages to the head portions of the list of expected messages in the client domains.

16. The method according to claim 11, further comprising the steps of:
    receiving in one of the client domains a new arriving message according to the data exchange protocol;
    in the one client domain searching for a match between the tag of the new arriving message and tags of messages in the head portion of the list of expected messages thereof; and
    upon a failure to find the match, passing the new arriving message to the master domain.

17. The method according to claim 16, further comprising the steps of:
    in the master domain attempting to match the tag of the new arriving message with the tags of messages in the tail portion of the list of expected messages; and
    upon a failure to match the tag of the new arriving message with the tags of messages in the tail portion of the list of expected messages, adding the new arriving message to a list of unexpected messages.

18. An apparatus, comprising
    a computer connected to a network; and
    a memory accessible by the computer wherein the computer is configured for:
    executing a process comprising a master domain and client domains, the process receiving messages via the network according to a predefined data respective identification tags, the messages comprising posted receives arriving in the master domain and arriving messages received in the client domains;
    establishing a list of expected messages in the memory having a tail portion in the master domain and respective head portions in the client domains; and
    matching tags of the posted receives and the arriving messages in the head portion of the list of expected messages of the client domains.

19. The apparatus according to claim 18, further comprising at least one host channel adapter connecting the computer with the network that receives a portion of the messages.

20. The apparatus according to claim 18, wherein the computer is configured for:
establishing a list of unexpected messages in the master domain;
receiving in the master domain a new posted receive according to a data exchange protocol;
comparing the tag of the new posted receive to the tags in the list of unexpected messages; and
upon a failure to find a match with the tag of the new posted receive in the list of unexpected messages adding the new posted receive to the list of expected messages.

21. The apparatus according to claim 20, wherein the new posted receive is a wildcard source message, wherein the computer is configured for:
adding the new posted receive to the list of expected messages and
preventing addition of new messages to the head portions of the list of expected messages in the client domains until the wildcard source message has been matched with another message that was sent from an originating process of the wildcard source message.

22. The apparatus according to claim 18, wherein the computer is configured for:
receiving in one of the client domains a new arriving message according to a data exchange protocol;
in the one client domain searching for a match between the tag of the new arriving message and tags of messages in the head portion of the list of expected messages thereof; and
upon a failure to find the match, passing the new arriving message to the master domain.

* * * * *